Sept. 27, 1932.   J. E. PERRY   1,879,820
DRINKING VESSEL
Filed March 24, 1930
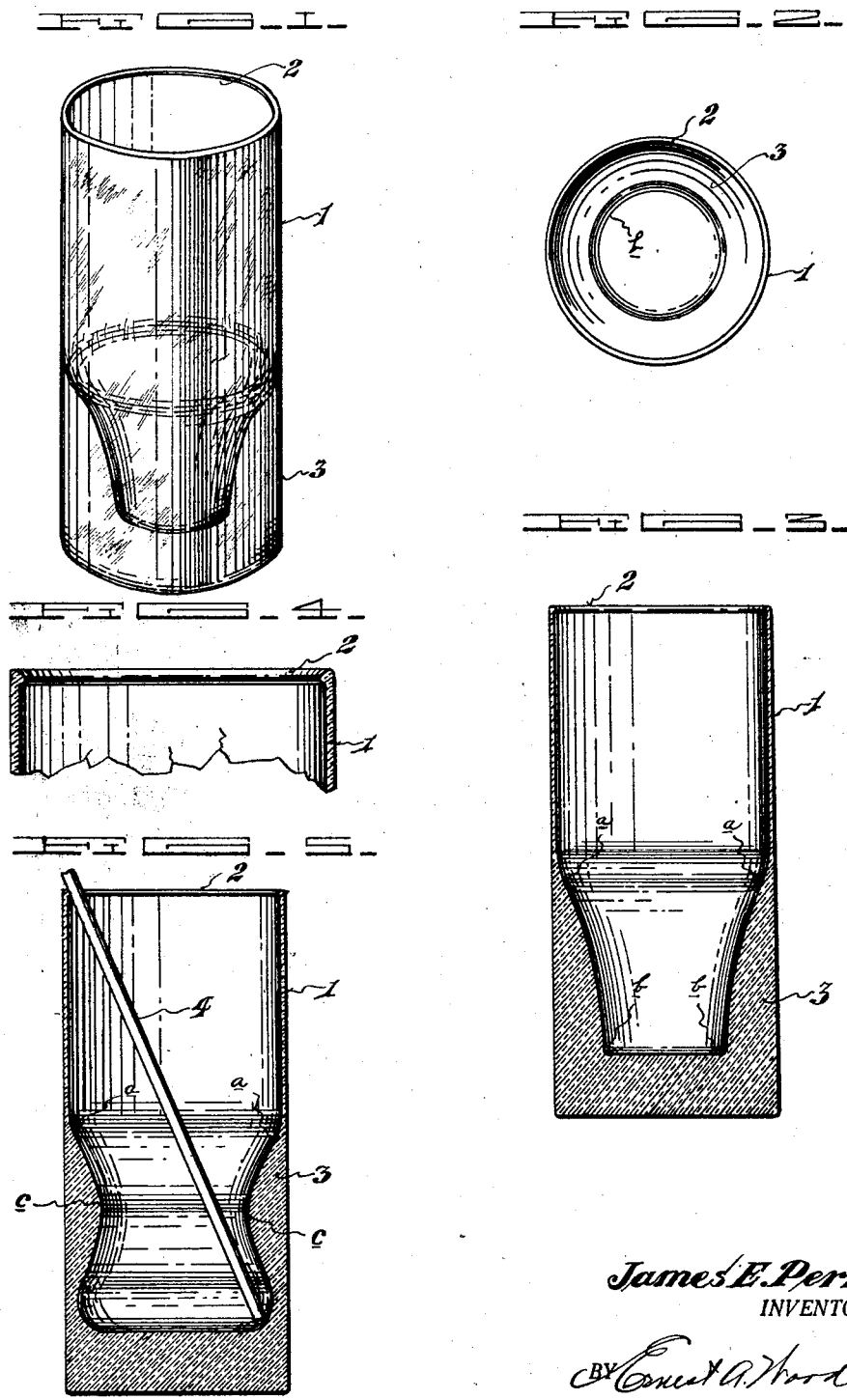
James E. Perry
INVENTOR.
ATTORNEY.

Patented Sept. 27, 1932

1,879,820

UNITED STATES PATENT OFFICE

JAMES E. PERRY, OF CARROLLTON, TEXAS

DRINKING VESSEL

Application filed March 24, 1930. Serial No. 438,390.

This invention relates to soda fountain glasses and it has particular reference to a new article of manufacture embodying an improved drinking glass and the principal object of the invention resides in the provision of an article of manufacture of the character specified, wherein the bottom portion is weighted by an excess of the same material of which the glass is composed, thus preventing accidental overturning of the glass and spilling the contents thereof.

Another object of the invention resides in the provision of a drinking glass particularly adapted for soda fountain use, especially since the advent of out-door or curb service, now practiced by drug stores, confectioneries and other refreshment establishments, the weighted bottom of the vessel preventing the latter from being overturned by reason of the presence of drinking or sipping straws in the glass, which act as a wind resistance, thus overturning the conventional glass.

Still another object of the invention resides in the new manufacture of a drinking glass of such construction that breakage and consequent expense will be reduced to the very minimum.

With the foregoing objects as paramount, the invention has particular reference to its salient features of construction and purposes, which will become manifest as the description proceeds, taken in connection with the accompanying drawing, wherein;

Figure 1 is a perspective view of one form of the invention.

Figure 2 is a plan view.

Figure 3 is a sectional view taken vertically on Figure 1.

Figure 4 is an enlarged fragmentary elevation in section showing the reinforced rim, guarding against nicking, and Figure 5 is a vertical sectional view of a modified form of the invention.

In certain parts of this country, especially in the south, refreshment establishments have adopted what is termed "curb service", which service is tendered as a convenience to those desiring to patronize the establishment without entering. In order to accommodate their patrons, soda glasses are conveyed on trays and served to the patrons without requiring that they leave their vehicle. The disadvantage encountered in this character of service is that the wind blowing against the sipping straws in the glasses will overturn the latter, spilling the contents on the patron.

Accordingly, the present invention is very effective in preventing occurrence of this nature as well as insuring against accidental breakage, which is accomplished by means of the reinforcement in the bottom of the vessel yet such reinforcement must be of such nature as to accommodate a sipping straw.

Continuing more in detail with the drawing, 1 designates the upper portion of the vessel, which is of conventional thickness. At the mouth of the vessel is provided an inwardly turned lip 2, which lip prevents nicking of the edges, thereby guarding against possible injury to the user thereof.

In the manufacture of the invention, the glass is blown to build up an excess, to produce a reinforced portion 3, which portion begins on a curved line at $a$ and increasing in thickness to the point $b$ as shown in Figures 1 and 3. The conventional soda fountain glass has a capacity of about seven ounces, therefore the upper portion 1 of the improved glass has a capacity of six ounces, while the reduced area within the reinforced portion 3 has a capacity of one ounce. The improved vessel however, is not limited to the capacity mentioned above.

The modified showing in Figure 5 embodies the added feature of a bulge $c$, intermediate the top and bottom of the reinforced portion. This bulge or prominence continues completely around on the inside of the glass and acts as a means to prevent the sipping straw 4 from rising in the liquid contents of the glass.

Manifestly, the construction shown is capable of some modification and such modification as is considered within the scope and meaning of the appended claim is also considered within the spirit and intent of the invention.

What is claimed is:

As a new article of manufacture, a soda fountain glass comprising the combination of a body provided with a rim at its top edge having an inwardly turned head and further having walls whose exterior surfaces are vertical, the interior surfaces of said walls being substantially vertical to a point approximately midway between the top and bottom of said body whereat said interior wall bulges inwardly thence outwardly terminating in a substantially flat bottom and defining an annular area immediately above said bottom of greater diameter than said bulge to hold a drinking straw against rising in the contents of said body.

In testimony whereof I affix my signature.

JAMES E. PERRY.